Feb. 18, 1969 E. A. ERICKSON 3,427,818
ELECTRONIC CONTROL
Filed Dec. 19, 1966
Sheet 1 of 2

INVENTOR
Ernest A. Erickson
BY Hofgren, Wegner, Allen, Stellman & Cord
ATTORNEYS Feb. 18, 1969
E. A. ERICKSON
3,427,818
ELECTRONIC CONTROL
Filed Dec. 19, 1966
Sheet 2 of 2
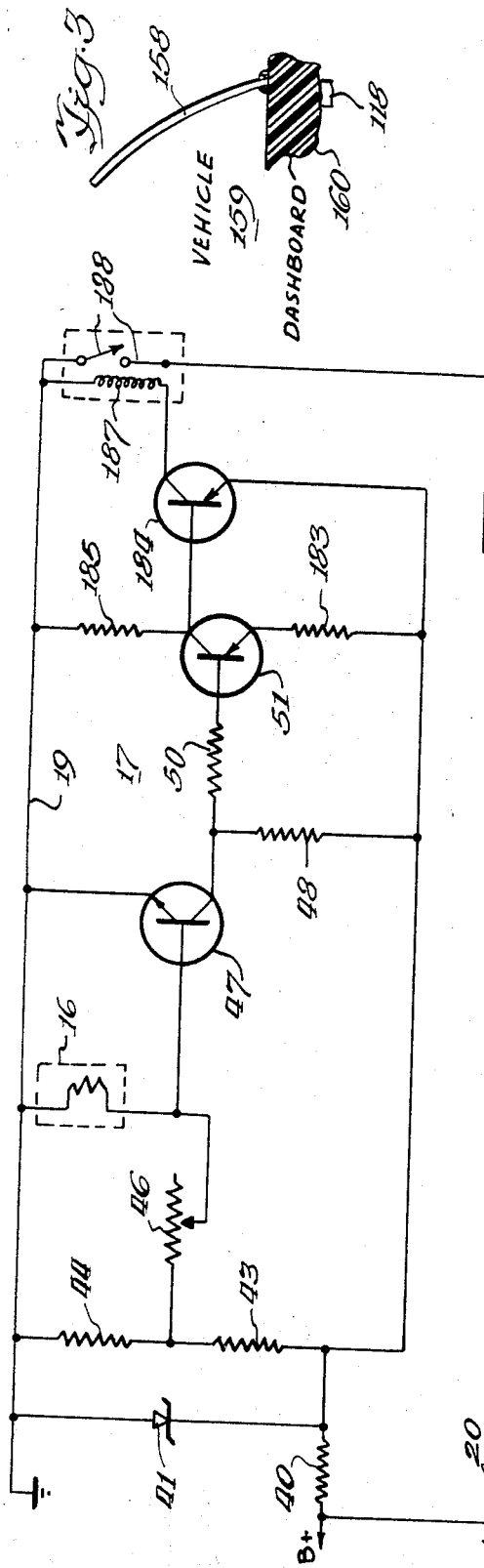
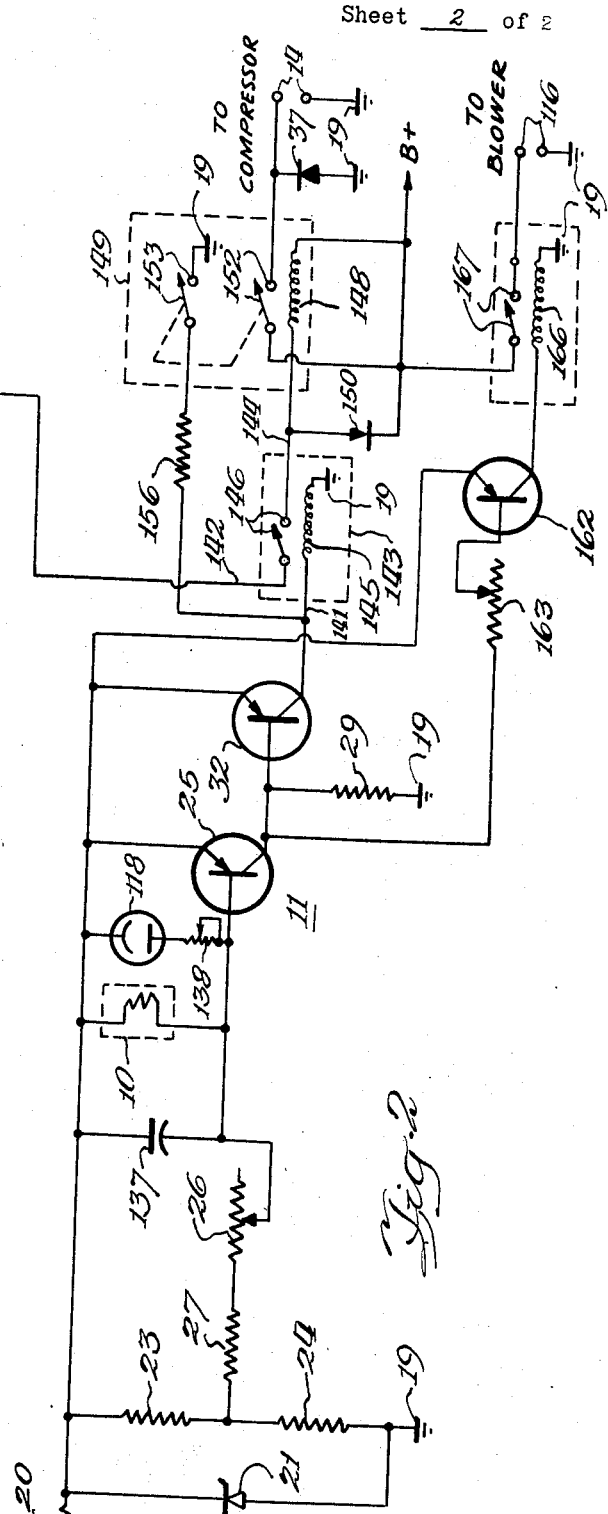
INVENTOR
Ernest A. Erickson
By Hofgren, Wegner, Allen, Stellman & McCord
ATTORNEYS United States Patent Office 3,427,818
Patented Feb. 18, 1969

3,427,818
ELECTRONIC CONTROL
Ernest A. Erickson, Sturtevant, Wis., assignor to Modine Manufacturing Company, a corporation of Wisconsin
Continuation-in-part of application Ser. No. 530,082, Feb. 26, 1966. This application Dec. 19, 1966, Ser. No. 611,515
U.S. Cl. 62—140    20 Claims
Int. Cl. F25d *21/02, 29/00;* B60h *3/04*

ABSTRACT OF THE DISCLOSURE

A transistorized control circuit for a vehicle air conditioner including an icing sensor which prevents energization of the cooling device when a freeze-out condition occurs. The cooling device and a blower fan are controlled both by a temperature sensor and by a photoelectric cell responsive to reflected sunlight.

---

This application is a continuation-in-part of my application filed Feb. 26, 1966, Ser. No. 530,082, entitled "Electronic Control," now abandoned.

This invention relates to an electronic control circuit for controlling the operation of temperature determining apparatus.

While certain portions of the invention may be used for either heating or cooling systems, the invention is described as incorporated in an air cooling device for the interior of a vehicle. A control circuit which merely turns the cooling device on when the sensed air temperature rises above a predetermined value and off when it falls below that value is, however, unsatisfactory for controlling a system which is subject to the build-up of frost or ice on an evaporator core. Unless this ice is allowed to melt, a "freeze-out" condition could occur. That is, the build-up of ice blocks the passage of air through the evaporator core, decreasing the efficiency of the air conditioner.

According to the invention, a transistorized control circuit is provided having an air temperature sensing circuit and an icing sensing circuit which overrides the air temperature circuit and prevents the energization of the cooling device before an undesirable icing condition occurs. Furthermore, this transistorized control is especially adapted for use in adverse environments which are subject to various extreme conditions, such as high temperatures and fluctuating power supply voltages.

For example, the ambient temperature in the interior of an automobile often reaches values which would otherwise be considered abnormal, when standing in the direct rays of the sun for a length of time. These high ambient temperatures adversely affect the operation of transistors, and without special compensation could cause a false indication of an icing condition.

The temperature control circuit is desirably operated from power supplies already available, such as the battery in an automobile. However, the voltage output of a typical automobile battery fluctuates over a substantial range of values. For example, a typical automobile battery is rated to generate 12 volts DC. However, the actual voltage output depends upon several factors, e.g., the age of the battery. A new battery may typically have an output of 12.8 volts, by itself. Furthermore, when the generator of the automobile is charging the battery, the voltage rises to 14 or 14.5 volts, and in some cases the maximum is in excess of this range. Such a fluctuating supply voltage presents special problems with regard to the operation of the control circuit.

The resolution of an air conditioner control may be defined as the amount of temperature deviation, in degrees, necessary to cause the control to recognize a new temperature and respond thereto. For maximum comfort the resolution should be high, i.e., adequate to maintain the selected temperature within a few degrees, and preferably within one degree, of the selected temperature. However, the resolution of a freeze-out sensing circuit should be less than the resolution of an air temperature sensing stage, and of such a value as to allow the temperature to rise sufficiently to melt the ice before the air conditioner is again operated. If the freeze-out sensing circuit has a higher resolution than desired, the air conditioner may rapidly cycle on and off, without melting the ice that may have formed.

Comparable prior control circuits have, in certain other respects, also operated in an unsatisfactory manner. A sensitive control which maintains a precise preselected temperature is ineffective for quickly cooling the vehicle interior when the air cooling system is first actuated. Furthermore, the air temperature in the passenger compartment is not an accurate indication of the comfort of passengers when sunlight passes through the windows of the vehicle. A temperature which is comfortable during the day time with direct sunlight is too cool at night.

According to the invention, a transistorized air conditioning control circuit is provided which overcomes the above problems. The apparatus has a greater temperature control effect when the difference between the desired and actual temperature is great, and a lesser temperature control effect when the desired and actual temperatures are within a few degrees. Furthermore, the apparatus is responsive to a light sensitive device for modifying the air temperature depending upon the amount of light energy which is present. In addition, the apparatus includes improved air temperature and icing sensing circuitry for more positive control of temperature.

One object of the invention is to provide an improved electronic circuit for controlling temperature.

Another object of this invention is to provide a control circuit which is especially adapted to operate in adverse environments, such as found in the interior of an automobile.

One feature of this invention is the provision of a transistorized air conditioner control having an air temperature sensing circuit and an icing sensing circuit, both of which employ compensation for high ambient temperatures.

Another feature of this invention is the provision of a transistorized air conditioning control circuit which can be powered by a power supply system havng a fluctuating DC voltage output.

Yet another feature of this invention is the provision of an air conditioner control circuit which responds to small differences in temperature, for maintaining the temperature very nearly at the selected value.

A further feature of this invention is the provision of an air conditioner control circuit having a freeze-out sensing circuit with a lower resolution than an air temperature sensing circuit and which insures a temperature rise sufficient to melt ice formed on the cooling device.

Still a further feature of this invention is the provision of an air conditioner control circuit employing cascaded transistors in an air temperature sensing circuit and in a freeze-out sensing circuit. The emitters of the transistors in the air sensing circuit are connected to resistors of a value which increase the resolution otherwise available from a thermistor temperature sensor. The base of a transistor in the freeze-out sensing circuit is connected to a resistor chosen to decrease the resolution otherwise available from a second thermistor temperature sensor, located to sense a freeze-out condition. Furthermore, the transistors in the icing sensing stage are composed of mixed semiconductor types, as, for example, germanium and silicon, causing the cascaded transistors to have a decreased conductance per unit rise in ambient temperature, thereby preventing the icing stage from disabling the cooling device merely due to high ambient temperatures.

Another feature of the invention is the provision of a temperature control apparatus which has a different temperature controlling effect depending upon the amount of deviation between the actual and desired temperature.

Still another feature of the invention is the provision of temperature control apparatus having a photosensor responsive to light energy for modifying the temperature maintained by the apparatus. More particularly, the circuit is responsive to the presence of sunlight for increasing the cooling within a passenger compartment.

Yet another feature of the invention is the provision of a transistorized air cooling control for energizing a cooling unit only when signals are generated by an air temperature sensing circuit, indicating that the actual temperature is above a predetermined value, and by an icing sensing circuit, indicating that an icing condition has not occurred.

Further features and advantages of the invention will be apparent from the following description and from the drawings, in which:

FIG. 2 is a schematic diagram of another embodiment of the invention; and

FIG. 3 is a fragmentary diagrammatic illustration of a vehicle, showing the location of the photosensor.

Figure 1:
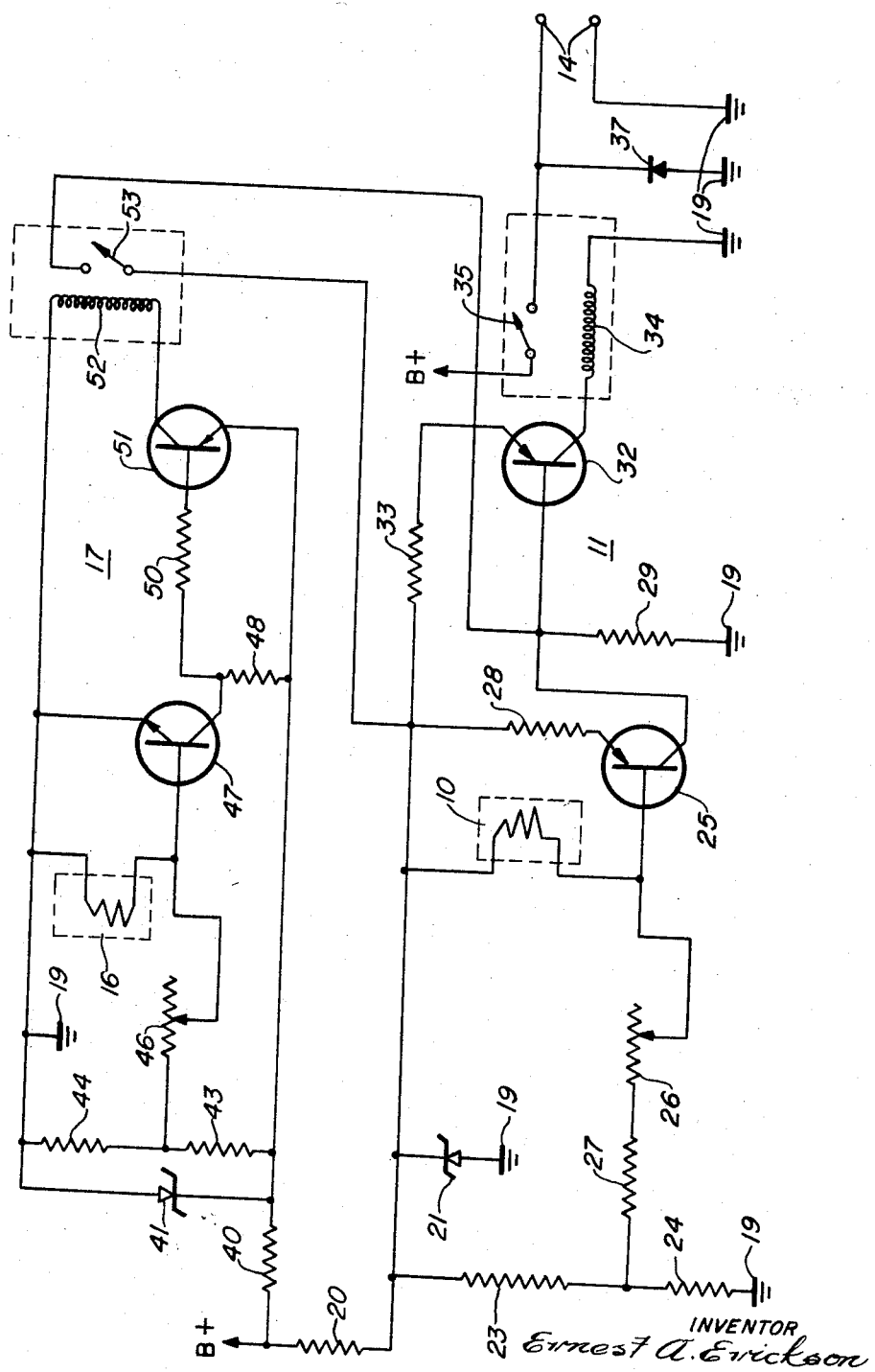
FIG. 1 is a schematic diagram of a circuit embodying the invention.

While illustrative embodiments of the invention are shown in the drawings and will be described in detail herein, the invention is susceptible of embodiment in several different forms, and it should be understood that the present disclosure is to be considered an exemplification of the principles of the invention and is not intended to limit the invention to the embodiments illustrated. Throughout the specification, values and type designations will be given for the components in order to disclose a complete, operative embodiment of the invention. However, it should be understood that these values and types are merely representative and are not critical unless specifically so stated. The scope of the invention will be pointed out in the appended claims.

The air conditioning control circuit is illustrated in schematic form in FIG. 1. A temperature sensor 10, forming a part of an air temperature control circuit 11, is mounted in a suitable position for monitoring the air temperature in the interior of an automobile. For example, sensor 10 may be located in the return air duct of a cooling air conditioner device (not illustrated). The desired air temperature is selected on a suitably calibrated control conveniently mounted for manipulation by the occupants of the automobile. When sensor 10 senses a temperature in excess of the preselected temperature, the voltage from the power supply of the automobile is switched across a pair of output terminals 14. Any air conditioner which can be energized by the application of the power supply voltage thereto may be connected to terminals 14. For example, a typical automobile air conditioner includes a compressor which causes a flow of cooling fluids to an evaporator core. The compressor is connected through an electrically actuated clutch with the engine of the automobile. When power supply voltage is applied to the clutch connected to terminals 14, the compressor is connected to the rotating shaft of the engine and the air conditioner cools the interior of the automobile.

In order to sense an icing condition in the evaporator unit, a second temperature sensor 16 is mounted in heat transfer relation with the coldest part of the evaporator core. When the temperature drops to 32°, an icing condition is indicated, and an icing sensing circuit 17, connected in circuit with sensor 16, becomes operative to disable air temperature control circuit 11, preventing power supply voltage from being switched to terminals 14.

Both air temperature circuit 11 and icing sensing circuit 17 are powered by the voltage available from the power supply (not illustrated) of the vehicle. One side of the power supply is designated in the drawing by B+, and the other side of the battery in the power supply is designated by a ground reference potential 19. Typically, the ground side 19 of the battery is connected to the frame of the vehicle, necessitating only a single power line between the control circuit and the battery, for connection to B+.

Considering the control circuit of FIG. 1 in more detail, air temperature sensor circuit 11 is connected to a constant voltage source formed by a 120 ohm resistor 20 and a Zener diode 21 connected in series between B+ and ground 19. Zener diode 21, when conducting, has a 10 volt drop thereacross, regardless of the voltage from the power supply during normal operation. Zener diode 21 is shunted by a voltage divider network consisting of a one kilohm resistor 23 in series with a 3.3 kilohm resistor 24. A PNP transistor 25, as a germanium type 2N404, is connected in a switching circuit with sensor 10 and the voltage dividing network.

Temperature sensor 10 is a thermistor having approximately a 1000 ohm resistance at 77° F. Thermistor 10 is connected between one side of Zener diode 21 and the base of transistor 25. A variable potentiometer 26, having a maximum 5000 ohm resistance, and a 1000 ohm resistor 27, are connected in series between the base of transistor 25 and the junction point of resistors 23 and 24. The emitter and collector of transistor 25 are connected across Zener diode 21 by a 5.6 ohm resistor 28 and a 560 ohm resistor 29, respectively.

A second PNP transistor 32, as a germanium type 2N404, is connected in cascade with transistor 25. The base of transistor 32 is directly connected to the collector of transistor 25. The emitter of transistor 32 is connected through a 10 ohm resistor 33 to the high voltage side of Zener diode 21. Resistor 33 is approximately double the size of the corresponding resistor 28 in the emitter of transistor 25. The collector of transistor 32 is connected through a relay coil 34 to ground 19. Relay 34 has a normally open single pole contact 35 connected in series between B+ and one of the output terminals 14. The relay may be of the reed type, having a 500 ohm coil 34. This relay is designed to pull in at approximately 7¾ volts, thereby closing normally open contact 35. The other side of the pair of output terminals 14 is directly connected to ground 19.

In operation, the cascaded transistors 25 and 32 always conduct to some extent, causing a voltage to be impressed across relay coil 34. However, until transistor 32 is sufficiently forward biased to cause the pull in voltage to be impressed across coil 34, contact 35 remains in its normally open position.

Transistor 25, which is always forward biased, causes a current to flow through resistor 28, the emitter and collector of transistor 25, and through resistor 29 to ground 19. The voltage drop across resistor 29 is in a direction which tends to back bias the emitter-base junction of transistor 32, causing it to conduct less current as transistor 25 conducts more current.

The amount of current passed by transistor 25 is determined by the instantaneous resistance of thermistor 10 and the setting of potentiometer 26. The thermistor, which has a decreasing resistance as temperature increases, effectively shunts the emitter-base junction of transistor 25. As the temperature increases, the voltage drop across thermistor 10 decreases and causes a decreased voltage drop across resistor 29. The forward bias of transistor 32 increases, and at the selected temperature the relay pulls in. Since each setting of potentiometer 26 corresponds to a different temperature at which thermistor 10 causes the air temperature stage 11 to be switched, this control may be suitably calibrated to indicate temperature directly. Resistor 27 is chosen to allow the full range of resistance of the potentiometer 26 to control the range of temperatures selectable by the occupants of the automobile, thus stretching out the dial settings for ease of selection.

In order to increase the resolution of air temperature control stage 11, resistors 28 and 33 are inserted in the emitter circuits of the transistors. For example, without resistors 28 and 33 and for the particular components disclosed, the temperature must cool approximately 2° or 3° once relay 34 is energized, before the relay drops out. However, by inserting resistors 28 and 33 in series with the emitters of the transistors, as illustrated, the resolution is increased, and approximately a one degree decrease in temperature causes relay 34 to drop out.

Diode 37 is a protective device which discharges the voltage generated by the clutch coil (not illustrated) when contact 35 opens to limit the voltage across open relay contacts 35 and prevent arcing.

The icing sensing circuit 17 is similar to temperature sensing circuit 11, but operates in a somewhat different manner. A constant voltage source is formed by a 120 ohm resistor 40 and a Zener diode 41, the same type as Zener diode 21, connected in series between B+ and ground 19. Series connected dropping resistors 43 and 44, 3.3 kilohms and one kilohm respectively, are connected across Zener diode 41. Sensor 16 is a thermistor having approximately 400 ohms resistance at 77° F. A potentiometer 46, having a maximum 3000 ohms resistance, is connected between thermistor 16 and the junction of resistors 43 and 44. The value of potentiometer 46 is factory-set, as well appear and is not adjustable by the occupants of the automobile.

Thermistor 16 directly shunts the emitter-base electrodes of an NPN transistor 47, as a silicon type 2N3394. The collector of transistor 47 is coupled through a 560 ohm resistor 48 to the high voltage side of Zener diode 41. A 10 kilohm resistor 50 directly connects the collector of transistor 47 with the base of a PNP transistor 51, as a germanium type 2N404, similar to transistors 25 and 32.

The emitter of transistor 51 is directly connected to the high voltage side of Zener diode 41, while the collector of this transistor is coupled through a relay coil 52 of a reed relay to ground 19. Relay 52, which has a normally open contact 53 associated therewith, is similar to relay coil 34 and its normally open contact 35. Contact 53, when closed by the energization of relay coil 52, connects the voltage across Zener diode 21 to the base of transistor 32 in the air temperature stage 11, back biasing transistor 32 to prevent relay coil 34 from being energized.

In operation, cascaded transistors 47 and 51 both normally conduct current, but to an extent insufficient to energize relay coil 52. An increase in the conduction of transistor 47 causes an increased voltage drop across resistor 48, which further forward biases transistor 51, causing an increased current flow through relay coil 52.

As the temperature drops, the resistance of thermistor 16 increases, causing an increased voltage drop thereacross which drives transistor 47 further into conduction. The resistance of potentiometer 46 is adjusted so that at 32°, the voltage drop across thermistor 16 causes transistors 47 and 51 to conduct sufficient current to energize relay coil 52. This in turn closes contact 53, applying a large positive voltage to the base of transistor 32 for back biasing the emitter-base junction to prevent relay coil 34 from being energized, regardless of the temperature sensed by thermistor 10.

Once the cooling device is deenergized, the temperature sensed by thermistor 16 quickly rises above 32°, and the time period before the cooling device is again energized may be insufficient to melt the ice previously formed, if any, unless the resolution of icing stage 17 is decreased. For example, if the resolution of icing sensing circuit 17 was the same as that of air temperature sensing circuit 11, namely one degree, the cooling unit would be undesirably cycled on and off at a rapid rate, when thermistor 10 sensed a high enough temperature. This results because the one degree temperature rise which again energizes the cooling device occurs before the ice can melt. To prevent this from occurring, resistor 50 is inserted in the base circuit of transistor 51, as illustrated, causing transistor 47 to have to conduct more heavily before sufficiently forward biasing transistor 51 to energize relay 52. For the particular values disclosed, the addition of resistor 50 causes the resolution of the icing sensing circuit to be approximately 3° F.

Because transistors are highly subject to changes in the ambient temperature, it is desirable to use transistors composed of different types of semiconductor material, in stage 11 and stage 17, for the reasons explained below. Increased ambient temperatures cause transistors to conduct more current for a given set of conditions. At high temperatures, such as caused when a automobile is left in the sun, the increased conduction of icing stage 17 could energize relay 52, although no icing condition were in fact present. To prevent this from occurring, transistors 47 and 51 are composed of different types of semiconductor material, namely silicon and germanium, respectively, while transistors 25 and 32 are both composed of the same conductor material, namely germanium. Since a silicon transistor is not as sensitive to high ambient temperatures as a germanium transistor, air temperature sensing circuit 11 has a higher rate of change of conductance per unit rise in the ambient temperature than icing circuit 17. Therefore, the control circuit operates properly at higher ambient temperatures than would otherwise be possible.

Turning now to FIG. 2, a modified form of the invention is illustrated. Components identical with those of FIG. 1 and performing the same function have been designated by the same reference numeral.

Air temperature control circuit 11 includes apparatus such that when a large temperature differential exists between the selected temperature and the temperature sensed by sensor 10, the voltage from the power supply is switched across a second pair of output terminals 116. A blower fan, such as located in the outlet air duct of a cooling air conditioner device (not illustrated), and which can be energized by the application of the power supply voltage thereto, may be connected to terminals 116. The voltage across terminals 116 switch the blower to its high speed, causing the automobile interior to be cooled at a more rapid rate. As the sensed temperature approaches the selected temperature, the circuit causes the air conditioner to have a lesser cooling effect on the interior of the automobile, as by turning the blower to a low speed or off. Should the temperature within the automobile suddenly rise to a high value, blower 116 will again be energized in order to return the air temperature to the desired value.

In addition to temperature sensor 10, air temperature control circuit 11 is also controlled by a photosensor 118 which is responsive to the average reflected light within the interior of the automobile for controlling the air temperature. During the daytime, when direct sunlight strikes the occupants of the automobile, photosensor 118 energizes the compressor clutch for a greater period of time, causing a slightly cooler air temperature to be maintained. At nighttime, when direct sunlight no longer exists, photosensor 118 causes a slightly warmer temperature to be maintained in the vehicle.

Photosensor 118 allows the occupants of an automobile to make a single selection of a comfortable temperature, and thereafter automatically maintains the same degree of passenger comfort in the daytime or nighttime. Although the actual temperature changes slightly during this time, the temperature sensation of the passengers remains constant, eliminating the necessity for readjustment of the air conditioning control.

Considering the control circuit in more detail, an 8 microfarad capacitor 137 shunts thermistor 10 to prevent any tendency for the circuit to oscillate. Photosensor 118 and a series connected variable potentiometer 138 are connected across thermistor 10. Photosensor 118 may be a selenium photoelectric cell, as an International Rectifier type B2M, whose positive polarity side is connected to potentiometer 138 in order to back bias transistor 25.

The base and emitter of transistor 32 are directly connected to the collector and emitter respectively of transistor 25. The collector of transistor 32 is connected to the first of two input lines 141 and 142 of a switching device 143 which has an output on a line 144 when signals are present on both of the input lines 141 and 142. Switching device 143 may be a relay of the reed type, having a 500 ohm coil 145 connected between line 141 and ground 19, which controls a normally open pair of contacts 146, one of which is connected to line 142, and the other of which is connected to output line 144. The relay is designed to pull in at approximately 7¾ volts, thereby closing normally open contacts 146 to connect output line 144 directly with input line 142. A signal on line 141 is defined as a voltage equal to or greater than the pull-in voltage needed to energize relay coil 145.

Output line 144 is directly connected to one side of a 300 ohm relay coil 148 of a power relay 149. The other side of coil 148 is connected directly to B+. The relay coil is shunted by a diode 150 to aid in deenergizing relay 149 when power is disconnected from coil 148. Coil 148 controls the closure of two pairs of normally open contacts 152 and 153. Contact 152, when closed by the energization of relay coil 148, directly connects B+ to one of the input terminals 14. Contacts 153, when closed, connect ground 19 through a 560 ohm resistor 156 to input line 141, and hence shunt a portion of the voltage at the collector of transistor 32 to ground 19 when relay coil 148 is energized.

In operation, the cascaded transistors 25 and 32 always conduct to some extent, as previously explained, causing a voltage to be impressed across the coil of relay 143. However, until transistor 32 is sufficiently forward biased to cause the pull-in voltage to be impressed across the coil, the normally open contacts of relay 143 remain open.

The amount of current passed by transistor 25 is determined by the instantaneous resistance of thermistor 10, the setting of potentiometer 26, and the voltage output from photosensor 118. The thermistor, which has a decreasing resistance as temperature increases, effectively shunts the emitter-base junction of transistor 25. As the temperature increases, the volt drop across thermistor 10 decreases and causes a decreased voltage across resistor 29. This in turn increases the forward bias of transistor 32, and at the selected temperature, the relay 143 pulls in, closing its normally open contacts 146.

Since contact 146 is normally connected to a signal at ground reference potential 19, as will appear, relay coil 148, the opposite side of which is connected to B+, is energized, closing contacts 152 and impressing battery voltage across output terminals 14. A signal is defined as a change in voltage from that previously existing, or a similar electrical condition which can convey intelligence about a change in the status of a condition. In the illustrated form of switching device 143, the signal on input line 142 and the signal on output line 144 correspond to zero volts, while the signal on input line 141 corresponds to the presence of a positive voltage equal to or greater than the pull-in voltage.

Resistor 156, switched in circuit when contacts 153 close, causes the air temperature circuit 11 to be more sensitive to smaller temperature changes. When relay 149 is energized, resistor 156 causes an increased voltage drop at the collector of transistor 32. This voltage drop represents approximately ½° F. of thermistor 10 resistance travel. Instead of the thermistor having to sense an approximately 1° cooling in temperature before its increased resistance will cause relay 145 to drop out, it now has to change only by approximately ½° F. The addition of resistor 156 and contacts 153 therefore allows the air temperature sensing circuit to be made more sensitive to small temperature variations, maintaining the temperature within the automobile at a more constant value.

Photosensor 118 also controls the temperature within the vehicle. As the amount of light falling on photosensor 118 is increased, representing an increased heat load, an increased voltage will be generated which further back biases transistor 25, forward biasing transistor 32 to a greater extent to energize terminals 14 sooner. As lesser amounts of light impinge photocell 118, such as at nighttime when a warmer car is desired, output terminals 14 will be energized for a lesser period of time. Although the final output temperature will vary for a fixed setting of potentiometer 26, the effective temperature as sensed by the passengers, that is, the comfort index of the passengers, will remain fixed.

Photosensor 118 is preferably mounted at a location which is shaded from direct sunlight. For example, in FIG. 3, a portion of a vehicle is illustrated having a window 158 of light transparent material for admitting sunlight into the interior or passenger holding compartment 159 of the vehicle. A dashboard 160 may be provided for mounting instruments relating to the operation of the vehicle, as is conventional. If photosensor 118 was mounted with an unobstructed view of window 158, shadows, such as caused when a vehicle passes a telephone pole which momentarily blocks the sunlight, would cause the control to attempt to change the interior vehicle temperature. Such operation is undesired.

To overcome the effect of shadows, photosensor 118 may be mounted on the underside of dashboard 160, as illustrated, and positioned to respond to the average value of reflected sunlight found within compartment 159. Such average reflected sunlight will not change in value although portions of compartment 159 may be momentarily shaded from the sun. Similarly, photosensor 118 could be mounted directly on an air conditioner control unit mounted within or underneath dashboard 160, or other means can be used to avoid the influence of momentary shadows, such as filters or suitable circuitry.

Potentiometer 138 is factory adjusted in order to compensate for different factors which effect the output from photosensor 118, such as different size passenger compartments or different locations for photosensor 118.

Air temperature stage 11 also controls a blower circuit for energizing terminals 116, in addition to the compressor energizing portion of the circuit discussed above. More particularly, transistor 25 drives a PNP transistor 162 in addition to transistor 32. The base of transistor 162 is connected through a variable one kilohm potentiometer 163 to the collector of transistor 25. The emitter of transistor 162 is directly connected to the high voltage side of Zener diode 21. The collector of the transistor is connected to one side of a 250 ohm relay coil 166, the other side of which is connected to ground 19. Relay coil 166, when energized, closes a pair of normally open contacts 167, thereby directly connecting B+ to one of the output terminals 116. The other of the output terminals 116 is connected to ground 19.

When the power supply voltage is switched across terminals 116 by the energization of relay coil 166, a blower motor (not illustrated) is preferably switched from a low speed to a high speed condition, thereby circulating more air through the interior of the vehicle. For example, a voltage dropping resistor (not illustrated) may be connected in series between B+ and a DC blower motor. Contacts 116 could be connected across the voltage dropping resistor. In such a circuit, the blower operating voltage would be lowered from B+ potential until such time as the contacts 167 close, causing full B+ potential to appear across the motor terminals and switching the motor to its maximum speed. However, if desired, a single speed blower motor could be directly connected to terminals 116. In such a case, the motor would remain off until relay 166 was energized to cause the blower to run at a constant speed.

Transistor 162 operates in the same sense as transistor 32, that is, both increase conduction as temperature increases. Assuming a sufficient temperature differential when air conditioning circuit 11 is first energized, transistor 162 will energize relay coil 166, causing the blower to operate with maximum efficiency in order to decrease rapidly the temperature within the interior of the vehicle. At a temperature determined by the setting of potentiometer 163, relay 166 will pull out, switching the blower to its low speed operation.

The temperature differential needed to energize the blower circuit should be greater than the temperature differential needed to energize the compressor circuit. A typical temperature differential for the blower portion of the circuit is 4–5° F. higher than the set point of potentiometer 26. Since the compressor portion cycles within 1° F. or so of the set point, the blower will operate at low speed while relay 149 is cycling to maintain the interior temperature of the vehicle essentially constant. In the event the air conditioning system is unable to maintain the selected temperature, the rising temperature will actuate the blower circuit, increasing blower speed to insure maximum air circulation from the cooling evaporator.

The icing sensing circuit 17 of FIG. 2 has an extra transistor to invert the "logic" of the circuit 17 of FIG. 1. More particularly, the collector of transistor 51 is coupled to the base of a NPN transistor 184, of the same type as transistor 51. The collector of transistor 51 and the base of transistor 184 are also coupled through a 560 ohm resistor 185 to ground 19. A 500 ohm relay coil 187 is connected between ground 19 and the collector of transistor 184. The emitter of transistor 184 is directly connected to the high voltage side of Zener diode 41 for completing a current flow path through relay coil 187. This relay controls a pair of normally open contacts 188, which, when energized, close to connect ground 19 to line 142.

In operation, transistor 184 normally conducts sufficient current to maintain relay coil 185 energized and hence connect ground 19 to line 142. An increase in the conduction of transistor 47 further forward biases transistor 51, as previously explained, which in turn further reverse biases transistor 184 to cause a decreased current flow through relay coil 187.

As the temperature drops toward the freeze-out condition, the resistance of thermistor 16 increases until at 32° F. transistor 47 and 51 conduct sufficient current to back bias transistor 184 and drop out relay coil 187. This in turn opens contacts 188, terminating the signal on input line 142 and output line 144 to prevent relay coil 148 from being energized.

The blower portion of the circuit operates independently from the freeze-out circuit 17, since contacts 188 only control deenergization of relay coil 148, and not relay coil 166. Therefore, the blower can operate at its high speed although a freeze-out condition occurs. The resulting increased air circulation will increase the amount of air which is circulated across the evaporator coils, melting the ice formed thereon in a shorter period of time than possible if icing circuit 17 also controlled the blower speed.

Depending upon the exact application for the control circuit, various of the features discussed herein may be eliminated or combined in different manners, within the scope of the invention, for the purposes disclosed.

I claim:

1. A circuit for controlling the energization of a cooling device which is subject to icing, comprising: a source of DC voltage; a temperature sensing stage including a first temperature responsive sensor, first transistor means having an output coupled to said cooling device, and network means connecting said first sensor and said DC source to said first transistor means for energizing said cooling device when the temperature sensed by said first sensor rises above a predetermined value; a second temperature responsive sensor in heat transfer relationship with said cooling device; an icing sensing stage including said second sensor, second transistor means having an output line, and network means connecting said second sensor and said DC source to said second transistor means for developing a signal on said output line when the temperature sensed by said second sensor drops below a value which indicates a freezing condition; and means connecting said output line to said first transistor means for back biasing said first transistor means when said signal is present, preventing the energization of said cooling device.

2. The control circuit of claim 1 wherein said first transistor means has a greater rate of change of conductance per unit rise in ambient temperature than said second transistor means, for preventing the icing stage from disabling the temperature stage due to high ambient temperatures.

3. The control circuit of claim 2 wherein said first transistor means includes cascaded transistors composed of one type of semiconductor material, and said second transistor means includes cascaded transistors composed of mixed types of semiconductor material, including said one type, thereby providing a greater rate of change of conductance for said first transistor means.

4. The control circuit of claim 1 wherein said network means connecting said sensors and said DC source to said transistor means includes voltage regulation means in at least one of said sensing stages, allowing said control circuit to be used with DC sources having fluctuating output voltages.

5. The control circuit of claim 1 wherein said second transistor means includes a transistor having emitter, base and collector electrodes, and resistive means in circuit with said electrodes for decreasing the resolution of said icing sensing stage, said resistive means having a value which causes the temperature at said second sensor to rise sufficiently to melt the ice before said temperature sensing stage regains control over the energization of said cooling device.

6. The control circuit of claim 5 wherein said resistive means comprises a resistor in series with said base electrode.

7. The control circuit of claim 1 wherein said temperature sensing stage includes cascaded transistors connected to a first relay having normally open contacts, means connecting said DC source to one of said contacts and the cooling devices to the other of said contacts, said DC source energizing said cooling device when said relay is energized, said icing sensing stage includes cascaded transistors connected to a second relay having normally open contacts, and means connecting said DC source to one of said contacts and said output line to the other of said contacts, for back biasing at least one of the cascaded transistors in said temperature sensing stage when said second relay is energized.

8. A circuit for controlling the energization of a cooling device, comprising: a source of DC voltage; a temperature sensing stage including a temperature responsive sensor, means including first and second cascaded transistors having an output coupled to said cooling device, each transistor having emitter, base and collector electrodes, and network means connecting said sensor and said DC source to said cascaded transistors for energizing said cooling device when the temperature sensed by said sensor rises above a predetermined value, said network means including resistive means inserted in a circuit with said electrodes for increasing the resolution of said temperature sensing stage, thereby causing a smaller incremental decrease in temperature from said predetermined temperature to deenergize said cooling device.

9. The control circuit of claim 8 wherein said resistive means comprises a first resistor connected in circuit with the emitter of said first transistor, and a second resistor of higher value connected in circuit with the emitter of said second transistor.

10. The control circuit of claim 8 wherein said network means includes Zener diode means for allowing said control circuit to be used with DC sources having fluctuating output voltages.

11. Temperature control apparatus, comprising: means responsive to a sensed temperature different from a predetermined temperature value for returning the sensed temperature to the predetermined temperature value; photosensor means having a condition responsive to light energy; and means connecting said photosensor means in circuit with said sensed temperature responsive means for modifying the predetermined temperature in response to a change in condition of said photosensor means.

12. The apparatus of claim 11 in a vehicle having means admitting light energy to a passenger containing compartment, wherein said sensed temperature responsive means controls the temperature within said compartment, and means mounting said photosensor means on said vehicle in a position responsive to the light energy admitted to said compartment.

13. The apparatus of claim 12 wherein said photosensor means is mounted within said compartment and is responsive to the ambient light therein.

14. The apparatus of claim 13 wherein said photosensor means is mounted in a position which is shaded from direct sunlight which may be admitted through the light admitting means.

15. Temperature control apparatus, comprising: sensor means for monitoring temperature; heat exchange means for controlling temperature; means connecting said temperature sensor in circuit with said heat exchange means and responsive to a sensed temperature different from a predetermined value for operating the heat exchange means to return the temperature to the predetermined value; blower means having first and second speed conditions for causing said heat exchange means to have a different temperature controlling effect; and means for controlling the condition of said blower means in response to the temperature sensed by said senor means.

16. The apparatus of claim 15 wherein said heat exchange means comprises a cooling device and said blower means operates at a high and a low speed condition, said circuit means switching said blower from the low to the high speed condition when the temperature exceeds said predetermined value.

17. The apparatus of claim 15 wherein said temperature control apparatus includes an icing sensing stage for sensing the occurrence of an icing condition, and means resposive to a sensed icing condition for disabling said heat exchange means without disabling said blower means.

18. A circuit for controlling the energization of a cooling apparatus which is subject to icing, comprising: means having first and second inputs and an output for controlling energization of said cooling apparatus only when signals are present at both said inputs; a source of DC voltage; a temperature sensing stage including a first temperature responsive sensor, first transistor means having an output coupled to said first input, means connecting said first sensor and said DC source to said first transistor means for coupling a signal to said first input when the temperature sensed by said first sensor rises above a predetermined value; an icing sensing stage including a second temperature responsive sensor in heat transfer relationship with said cooling apparatus, second transistor means normally developing a signal coupled to said second input, and means connecting said second sensor and said DC source to said second transistor means for disabling said last named signal when the temperature sensed by said second sensor drops below a value indicating a freezing condition, thereby preventing the energization of said cooling apparatus.

19. The apparatus of claim 18 wherein said first named means comprises a relay having a relay coil which closes a pair of contacts when energized by a signal, means connecting said output to one of said pair of contacts, and means connecting said inputs to said other pair of contacts and said relay coil.

20. The apparatus of claim 18 wherein said first transistor means has a voltage output which forms said signal only when said voltage output reaches a predetermined amplitude, and means for dissipating a portion of said voltage output when said cooling apparatus is energized, increasing the sensitivity of said temperature sensing stage to small changes in temperature.

References Cited

UNITED STATES PATENTS

| | | | |
|---|---|---|---|
| 2,377,782 | 6/1945 | Hedman | 62—140 XR |
| 3,040,543 | 6/1962 | Atchison | 62—181 |
| 3,120,108 | 2/1964 | Pausing | 62—140 XR |
| 3,222,882 | 12/1965 | Sutton | 62—140 XR |
| 3,298,191 | 1/1967 | Burke | 62—140 |
| 3,359,749 | 12/1967 | Howland | 62—140 |

MEYER PERLIN, *Primary Examiner.*

U.S. Cl. X.R.

62—180, 209, 228